US008065662B1

(12) United States Patent
Trounine et al.

(10) Patent No.: US 8,065,662 B1
(45) Date of Patent: Nov. 22, 2011

(54) COMPATIBILITY TESTING OF AN APPLICATION PROGRAMMING INTERFACE

(75) Inventors: Dmitri Trounine, St. Petersburg (RU); Alexander K. Glasman, St. Petersburg (RU); Mikhail Alexandrovich Smirnov, St. Petersburg (RU)

(73) Assignee: Oracle America, Inc., Redwood City, CA (US)

( * ) Notice: Subject to any disclaimer, the term of this patent is extended or adjusted under 35 U.S.C. 154(b) by 1271 days.

(21) Appl. No.: 11/731,640

(22) Filed: Mar. 30, 2007

(51) Int. Cl.
*G06F 9/44* (2006.01)
(52) U.S. Cl. ........ 717/124; 717/126; 713/182; 713/186; 726/2
(58) Field of Classification Search ........................ None
See application file for complete search history.

(56) References Cited

U.S. PATENT DOCUMENTS

| | | | |
|---|---|---|---|
| 6,363,488 B1 * | 3/2002 | Ginter et al. ........................ 726/1 |
| 6,434,628 B1 * | 8/2002 | Bowman-Amuah ............. 714/48 |
| 6,550,057 B1 * | 4/2003 | Bowman-Amuah .......... 717/126 |
| 6,601,192 B1 * | 7/2003 | Bowman-Amuah ............. 714/38 |
| 6,604,209 B1 * | 8/2003 | Grucci et al. .................... 714/38 |
| 6,651,186 B1 * | 11/2003 | Schwabe .......................... 714/38 |
| 6,898,784 B1 * | 5/2005 | Kossatchev et al. ........... 717/126 |
| 6,981,245 B1 * | 12/2005 | Schwabe ........................ 717/126 |
| 7,243,090 B2 * | 7/2007 | Kinzhalin et al. .................... 1/1 |
| 7,389,495 B2 * | 6/2008 | Wang et al. .................... 717/126 |
| 7,536,679 B1 * | 5/2009 | O'Connell et al. ........... 717/126 |
| 7,778,866 B2 * | 8/2010 | Hughes ............................ 705/11 |
| 2002/0198868 A1 * | 12/2002 | Kinzhalin et al. ................. 707/3 |
| 2003/0177475 A1 * | 9/2003 | de Jong ......................... 717/120 |
| 2003/0196189 A1 * | 10/2003 | Wang et al. .................... 717/124 |
| 2004/0153827 A1 * | 8/2004 | Schwabe ......................... 714/38 |
| 2004/0243881 A1 * | 12/2004 | Wang et al. ..................... 714/37 |
| 2005/0160395 A1 * | 7/2005 | Hughes ......................... 717/102 |

OTHER PUBLICATIONS

Title: Compatibility of biometric strengthening with probabilistic neural network, author: Shih-Yin Ooi et al, dated; Apr. 23, 2008.*
Sun Microsystems, "Application Programming Interface, Java Card™ Platform," Version 2.2.2, Mar. 2006, pp. 247-264.
Biometric Consortium Interoperability, Assurance, and Performance Working Group, "Java Card™ Biometric API White Paper (Working Document)," Version 1.1, Aug. 7, 2002, pp. 1-15.
Sun Microsystems, "Java Card™ Technology Compatibility Kit 2.2.2 User's Guide, for Technology Licensees," Mar. 2006, pp. 1-92.

* cited by examiner

*Primary Examiner* — Chameli Das
(74) *Attorney, Agent, or Firm* — Osha • Liang LLP

(57) ABSTRACT

A method for compatibility testing that includes executing a test suite to test an application programming interface (API) implementation, wherein the test suite comprises a plurality of compatibility tests that test the compatibility of the API implementation to an API specification. The method also includes requesting sample data for at least one test of the plurality of compatibility tests using a provider interface, wherein the sample data corresponds to the API implementation, and receiving the requested sample data from a provider, wherein the provider implements the provider interface. In addition, the method includes using the sample data by the at least one test to test the API implementation, receiving a result of the at least one test, and reporting a result of executing the test suite using the result of the at least one test.

16 Claims, 8 Drawing Sheets

Biometric Provider Interface 206

Biometric Provider Interface 306

COMPATIBILITY TESTING OF AN APPLICATION PROGRAMMING INTERFACE

BACKGROUND

Authentication is the process of verifying the identity of a user or a computing device in both stand alone terminals and networked environments. In private and public computer networks (including the Internet), authentication is commonly performed through the use of logon passwords. Knowledge of the password is assumed to guarantee that the user is authentic. Typically, each user initially registers using an assigned or self-declared password. On each subsequent use, the user must remember and use the previously declared password.

Biometrics makes use of a user's personal characteristics to perform authentication. A user's personal characteristics may include, for example, unique patterns and/or traits in fingerprints, irises, voice, faces, and/or DNA. These personal characteristics may be acquired using a variety of biometric devices including, for example, a fingerprint scanner, a retinal scanner, a voice acquisition hardware/software unit, and other devices well known in the art.

Organizations that distribute sensitive information (e.g., flat files, databases, web pages, web application, web services, and applications) to authorized parties over a network are increasingly adopting biometrics as a necessary component for authentication. In a general sense, each type of sensitive information (e.g., a sensitive file, database, application, web application, web page, web service, etc.) may be referred to as a secure resource. Some secure resources may be more sensitive than other secure resources, and thus may require a more rigorous authentication process. Also, some secure resources and users may require different access interfaces.

To use a biometric for authentication, a user must be enrolled in the biometric authorization system. More specifically, an initial biometric image (i.e., a biometric sample) is acquired from the user. This image may be processed to extract characteristic features from the image. The image or some characteristic representation of the image (i.e., a reference biometric template) is then stored securely for future reference. During an authentication procedure, a new image is taken from a candidate individual, the new image is processed to create a candidate biometric template, the candidate biometric template is compared with the reference biometric template, and a decision made as to whether or not the candidate biometric template matches the reference biometric template.

In a biometric authorization system, a biometric server may provide biometric authentication services such as enrollment of users, storage of users' reference biometric templates, and matching reference biometric templates to candidate biometric templates. Typically, a biometric server application on the biometric server provides a user interface that may be used by other parts of the biometric authorization system to request the biometric authentication services of the biometric server. The biometric server application processes the service requests using a biometric application programming interface (API) implemented by the biometric server. More specifically, the biometric server may include a concrete implementation of a biometry API that exposes classes and interfaces for using the services (e.g., biometric matching, user enrollment, reference template creation, etc.).

The biometry API may be defined by a biometry API specification. A biometry API Specification is a document that describes all the components (i.e., classes, interfaces, functions, etc.) of the biometry API and the intended behavior of these components. This description is in the form of compatibility rules (i.e., statements or assertions about the intended behavior). One example of a biometry API specification is the JAVA CARD™ Biometry API Specification. JAVA CARD™ is a trademark of Sun Microsystems, Inc. headquartered in Santa Clara, Calif.

Typically, an implementation of a biometry API is tested for compliance (i.e., compatibility) to the biometry API specification. In general, the compatibility testing exercises features of the API to ensure that the implementation of the features complies with the compatibility rules (i.e., assertions) in the specification.

SUMMARY OF INVENTION

In general, in one aspect, the invention relates to a system for compatibility testing that includes a test suite including a plurality of compatibility tests, wherein the test suite is configured to use a provider interface to request sample data for the plurality of compatibility tests, wherein the sample data corresponds to an application programming interface (API) implementation. The system also includes a provider configured to implement the provider interface, wherein the provider supplies the requested sample data to the test suite, wherein the plurality of compatibility tests test the compatibility of the API implementation to an API specification.

In general, in one aspect, the invention relates to a method for compatibility testing that includes executing a test suite to test an application programming interface (API) implementation, wherein the test suite comprises a plurality of compatibility tests that test the compatibility of the API implementation to an API specification. The method also includes requesting sample data for at least one test of the plurality of compatibility tests using a provider interface, wherein the sample data corresponds to the API implementation, and receiving the requested sample data from a provider, wherein the provider implements the provider interface. In addition, the method includes using the sample data by the at least one test to test the API implementation, receiving a result of the at least one test, and reporting a result of executing the test suite using the result of the at least one test.

In general, in one aspect, the invention relates to a computer readable medium comprising computer code embodied therein for causing a computer system to perform compatibility testing, the computer program code comprising instructions to execute a test suite to test an application programming interface (API) implementation, wherein the test suite comprises a plurality of compatibility tests that test the compatibility of the API implementation to an API specification. The computer program code also includes instructions to request sample data for at least one test of the plurality of compatibility tests using a provider interface, wherein the sample data corresponds to the API implementation, and to receive the requested sample data from a provider, wherein the provider implements the provider interface. In addition, the computer program code also includes instructions to use the sample data by the at least one test to test the API implementation, to receive a result of the at least one test, and to report a result of executing the test suite using the result of the at least one test.

Other aspects and advantages of the invention will be apparent from the following description and the appended claims.

BRIEF DESCRIPTION OF DRAWINGS

FIGS. 1B-5 show systems for testing a biometry API in accordance with one or more embodiments of the invention.

DETAILED DESCRIPTION

Figure 1A:
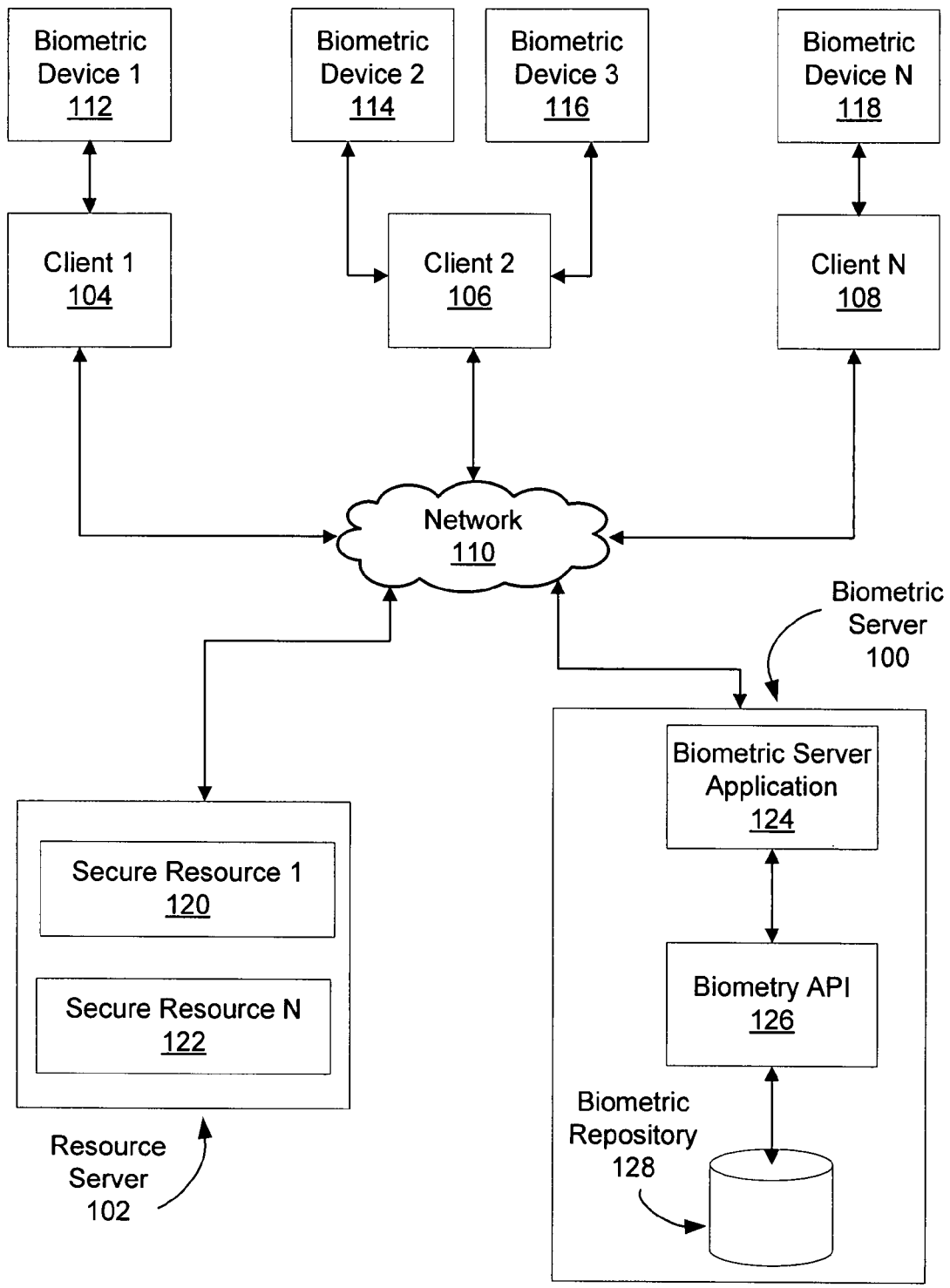
FIG. 1A shows a biometric authentication system in accordance with one or more embodiments of the invention.

Specific embodiments of the invention will now be described in detail with reference to the accompanying figures. Like elements in the various figures are denoted by like reference numerals for consistency.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention are directed to a system and method for compatibility testing. Compatibility testing includes verifying that an implementation of a technology is compatible with a specification of the technology. The technology specification includes a set of features, also referred to as assertions, which define the expected behaviors of an implementation of the specification. A test suite, sometimes referred to as a Technology Compatibility Kit, is used to test an implementation to certify that the implementation is a satisfactory implementation of the specification. An implementation may be certified if the result of executing the test suite shows that the implementation meets and passes a desired number of features, or assertions, in the specification.

For compatibility testing of an API used for processing data of some type, the test suite needs sample data of the types supported by the API. This data can be generated as needed by the test suite during execution if the API specification includes such functionality, or the data can be pre-generated and included in the test suite, if the data formats are defined in the API specification, either explicitly or by referring to an external definition. If the API specification does not include functionality for generating data or define the data formats, an API implementation may use any appropriate data formats. As a consequence, a test suite for certifying implementations of the API specification needs the ability to acquire sample data in the formats used by any API implementing the specification.

Embodiments of the invention relate to testing API implementations for compatibility to an API specification when the API specification does not specify the format of the data used by the API or provide for generating the data. One or more embodiments of the invention include a test suite with an interface for acquiring sample data in the types and formats needed to the test an API implementation and one or more providers that implement the interface and provide the required sample data for corresponding API implementations.

Further, embodiments of the invention relate to testing biometry API implementations to ensure compatibility with a corresponding biometry API specification. One or more embodiments of the invention include a test suite with a biometric provider interface for acquiring sample biometric data in the types and formats needed to the test a biometry API implementation and one or more biometric providers that implement the biometric provider interface and provide the required sample data for corresponding biometry API implementations. An example of a biometry API specification is the JAVA CARD™ Biometry API.

FIG. 1A shows a system for performing biometric authentication in accordance with one or more embodiments of the invention. As shown in FIG. 1A, the system includes one or more clients (e.g., Client 1 (104), Client 2 (106), Client N (108)), a biometric server (e.g., Biometric Server (100)), and a resource server (e.g., Resource Server (102)). The clients, biometric server, and resource server may be separate systems (e.g., servers, mainframes, desktop PCs, laptops, PDAs, etc.) connected through a network (e.g., Network (110)). The network (e.g., Network (110)) may contain both wired and/or wireless segments and may be a local area network, a wide area network, such as the Internet, or a combination local area and wide are networks.

In one or more embodiments, a resource server (e.g., Resource Server (102)) may include secure resources (e.g., Secure Resource 1 (130), Secure Resource N (135)) and/or un-secure resources (not shown). A user using a client (e.g., Client 1 (104), Client 2 (106), Client N (108)) may wish to access one or more of these secure and/or un-secure resources. Access to a secure resource may be controlled by one or more security policies (not shown). Further, a security policy may pertain to one or more secure resources. A security policy sets forth the authentication requirements for the one or more associated secure resources. For example, the security policy may set forth both the number and type of biometric samples required for authentication of a user to allow the user access to a secure resource. Those skilled in the art will appreciate that highly secure resources may require a variety of specific biometric samples for authentication (e.g., a fingerprint scan, a retinal scan, and a voice sample), while less secure resources may only require a single biometric sample for authentication (e.g., a single fingerprint scan). A security policy that requires one or more specific types of biometric samples may be referred to as a specific security policy. In one or more embodiments of the invention, the security policy of one or more secure resources may not specify the type of biometric sample but may permit any type of biometric sample for authentication. Such a security policy may be referred to as a general security policy.

In one or more embodiments of the invention, each client (e.g., Client 1 (104), Client 2 (106), Client N (108)) may be a Java client, a web-based client, a non-web based client, an application client, a terminal client, or any other type client. In one or more embodiments of the invention, each client (e.g., Client 1 (104), Client 2 (106), Client N (108)) may be connected to one or more biometric devices (e.g., Biometric Device 1 (112), Biometric Device 2 (114), Biometric Device 3 (116), Biometric Device N (118)). The connection between a biometric device and a client may be a USB connection, an Ethernet connect, or any other similar connection. A biometric device may be any device capable of acquiring a biometric sample (e.g., a fingerprint scan, a retinal scan, a voice sample, etc.) such as a fingerprint scanner, a retinal scanner, a voice acquisition hardware/software unit, a face scanner, a DNA analyzer, and combinations thereof.

In some embodiments of the invention, a client (e.g., Client 1 (104), Client 2 (106), Client N (108)) includes functionality to receive biometric images (e.g., a biometric image representing a fingerprint from a user attempting to access a secure resource) from biometric devices (e.g., Biometric Device 1 (112), Biometric Device 2 (114), Biometric Device 3 (116), Biometric Device N (118)) connected to the client, to process the biometric samples to generate candidate biometric templates, and to send the candidate biometric templates to a biometric server (e.g., Biometric Server (100)) for authentication. In one or more embodiments of the invention, a biometric device (e.g., Biometric Device 1 (112), Biometric Device 2 (114), Biometric Device 3 (116), Biometric Device N (118)) may include the functionality to process a biometric sample to generate a candidate biometric template. In such embodiments, a client connected to the biometric device may not include the functionality to process biometric images from the biometric device.

In one or more embodiments of the invention, a biometric server (e.g., Biometric Server (100)) provides functionality for biometric authentication of one or more users. This functionality may include enrollment of users (i.e., receiving reference biometric templates for the users), storage of the users' reference biometric templates, and authentication of users by matching reference biometric templates to candidate biometric templates. In some embodiments of the invention, for security purposes, the biometric server may be the only place in the biometric authentication system where the reference biometric templates are stored.

In one or more embodiments of the invention, a biometric server may be a part of a biometric device. A biometric server may also be a remote server connected to one or more biometric devices via secured network channels. In addition, a biometric server may be a portable token such as a smart card. A smart card is a card that includes an embedded microprocessor and/or a memory chip. If the biometric server is a smart card, the biometric authentication system includes a card acceptance device (not shown) that provides for data exchange between the smart card and other parts of the biometric authentication system. In some embodiments of the invention, this data exchange may use the Application Protocol Data Unit (APDU) protocol. The card acceptance device may support either contacted or contactless communication with the smart card.

In one or more embodiments, a biometric server (e.g., Biometric Server (100)) includes a biometric server application (e.g., Biometric Server Application (124)), a biometry API (e.g., Biometry API (126)), and a biometric repository (e.g., Biometric Repository (128)). The biometric server (e.g., Biometric Server (100)) may be configured to support heterogeneous application and system environments including, for example, SOLARIS™, developed by and a trademark of Sun Microsystems, Inc., Santa Clara, Calif. and WINDOWS®, developed by and a trademark of Microsoft Corporation, Redmond, Wash.

In one or more embodiments of the invention, a biometric server application (e.g., Biometric Server Application (124)) includes functionality to provide biometric authentication services to the other parts of the biometric authentication system. More specifically, the biometric server application (e.g., Biometric Server Application (124)) implements the security policy of an organization using the biometric authentication system for controlling access to sensitive resources. For example, when a user attempts to access a secure resource (e.g., Secure Resource 1 (120), Secure Resource 2 (122)), the user may be submit a biometric sample using a biometric device (e.g., Biometric Device 1 (112), Biometric Device 2 (114), Biometric Device 3 (116), Biometric Device N (118)) connected to a client (e.g., Client 1 (104), Client 2 (106), Client N (108)). A candidate biometric template based on the biometric sample is sent to the biometric server (e.g., Biometric Server (100)) for authentication. The biometric server application (e.g., Biometric Server Application (124)) on the biometric server receives the authentication request, causes the candidate biometric template to be compared to a reference biometric template to authenticate the user, and returns the result of the authentication to the client.

The biometric server application (e.g., Biometric Server Application (124)) may include functionality to manage the operation of the biometric server. That is, the biometric server application may include functionality to receive a request for a service (e.g., enrollment of a reference biometric template, authentication a user using a candidate biometric template presented by the user, etc.) from another part of the biometric authentication system (e.g., a client) and to delegate the service request to other modules (not shown) of the biometric server (e.g., Biometric Server (100)) for processing. The biometric server application (e.g., Biometric Server Application (124)) may also include functionality to receive the results of processing the request and generate a response to the request in the form expected by the requestor of the service.

In one or more embodiments of the invention, the biometric server application (e.g., Biometric Server Application (124)) processes the service requests using a biometry API (e.g., Biometry API (126)) implemented by the biometric server (e.g., Biometric Server (100)). More specifically, the biometry API (e.g., Biometry API (126)) exposes classes and interfaces for using the services (e.g., biometric matching, user enrollment, reference template creation, etc.) of the biometric server (e.g., Biometric Server (100)). The biometry API may be a concrete implementation of a biometry API specification that defines the classes and interfaces. In some embodiments of the invention, the biometry API specification may not define the formats of the biometric templates to be used by an implementation of the biometry API. Thus, the biometric templates may be in the format provided by a biometric device and/or client.

In one or more embodiments of the invention, a biometric repository (e.g., Biometric Repository (128)) stores a biometric profile for each enrolled user. A biometric profile may include one or more reference biometric templates for the user. The reference biometric templates may represent different types of biometric data, such as a fingerprint, iris scan, etc. The biometric repository may also include information identifying each client (e.g., IP Address, MAC address, client ID, etc.) and information identifying each biometric device connected to each client (e.g., biometric device model, biometric device ID, biometric device status, etc.). In some embodiments of the invention in which the biometric server is a smart card, the biometric repository may be part of the smart card (e.g., non-volatile memory such a Read Only Memory (ROM), programmable ROM (PROM), or electrically erasable PROM (EEPROM) on the smart card). In other embodiments of the invention, the biometric repository may be located on a separate device (e.g., a disk drive, flash memory, etc.) that is either directly connected to the biometric server or accessible by the biometric server over a network.

In one or more embodiments of the invention, a biometric server may be a JAVA CARD™. A JAVA CARD™ is a smart card that is capable of running programs written in the JAVA™ programming language using the JAVA CARD™ platform. JAVA™ is a trademark of Sun Microsystems, Inc. headquartered in Santa Clara, Calif. In such embodiments, the biometry API may be an implementation of the JAVA CARD™ Biometry API. Further, the biometric server application may be a specially designed JAVA CARD™ applet that uses the JAVA CARD™ Biometry API.

The JAVA CARD™ Biometry API includes a number of interfaces (e.g., OwnerBioTemplate, BioTemplate, SharedBioTemplate) that provide biometric functionality such as enrollment of a reference biometric template and matching a candidate biometric template with the previously stored reference template. The JAVA CARD™ Biometry API also includes a factory class (i.e., BioBuilder) used to obtain the BioTemplate instances (but not the biometric data). A biometric template represents a biometric sample that has been processed to extract characteristic features. The biometric templates may represent different types of biometric data, such as fingerprint, iris scan, etc. Also, the biometric templates can be stored in different biometric data formats. A concrete implementation of the JAVA CARD™ Biometry API can support one or more types of biometric data and one or more biometric data formats. Further, JAVA CARD™ Biometry API does not define the formats of the biometric templates to be used by an implementation of the API.

Figure 1B:
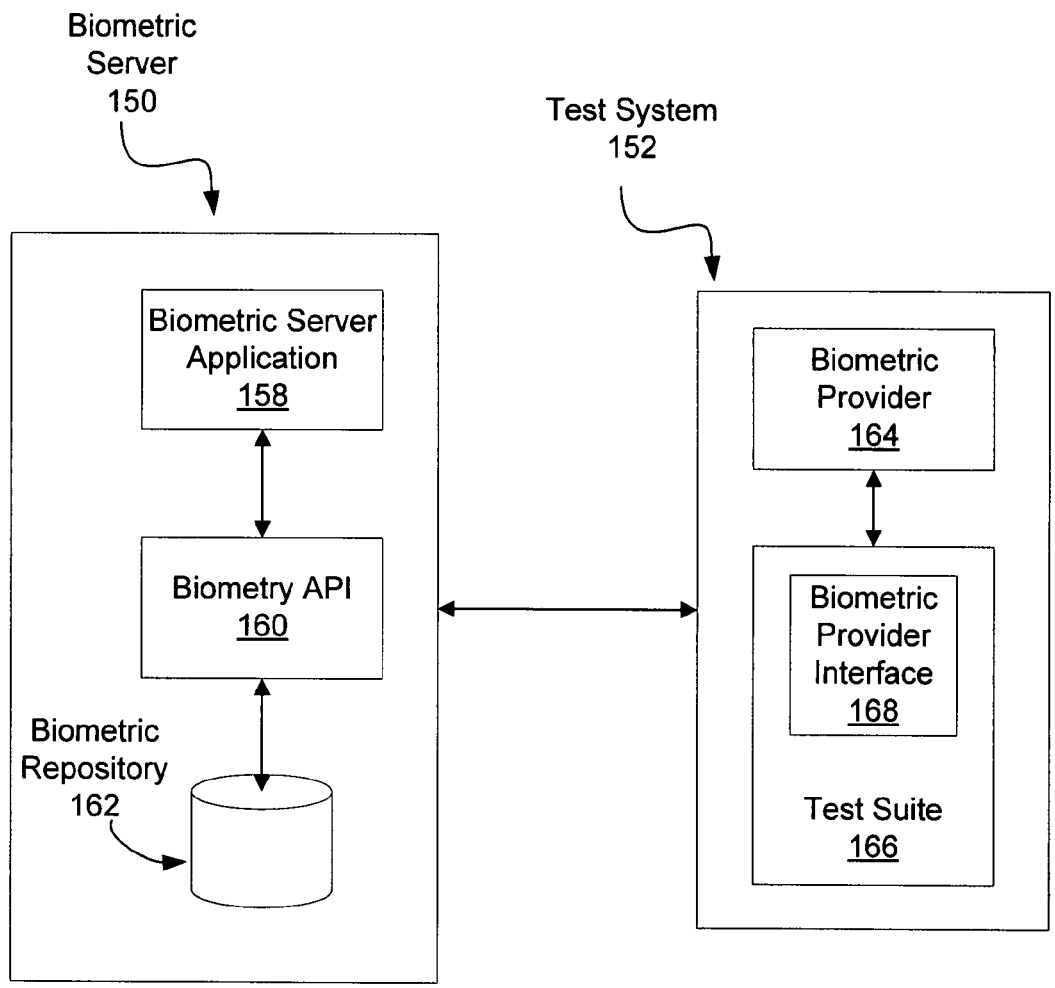

In one or more embodiments of the invention, a biometry API may be tested for compatibility with the biometry API specification. FIG. 1B shows a system for compatibility testing of a biometry API in accordance with one or more embodiments of the invention. As shown in FIG. 1B, the system includes a biometric server (e.g., Biometric Server (150)) and a test system (e.g., Test System (152)) connected to the biometric server. In one or more embodiments of the invention, the biometric server (e.g., Biometric Server (150)) includes a biometric server application (e.g., Biometric Server Application (158)), a biometry API (e.g., Biometry API (160)), and a biometry repository (e.g., Biometry Repository (162)). The biometric server, biometric server application, biometry API, and biometric repository may include functionality as previously described above in reference to FIG. 1B for similarly named components.

In one or more embodiments of the invention, a test system ((e.g., Test System (152)) may include a test suite (e.g., Test Suite (166)) and a biometric provider (e.g., Biometric Provider (164)). The test suite may be a TCK that includes tests specifically designed to verify that a biometry API (e.g., Biometry API (160)) conforms to the compatibility rules of the biometry API specification. More specifically, the biometry API specification may include a set of assertions that describe the behavior of an implementation of the biometry API. The test suite includes tests designed to verify that a biometry API implementing the specification meets a desired number of these assertions, thus certifying that the biometry API is compatible with the specification.

The tests in the test suite include the source code and any accompanying information for exercising the features of the biometry API to make sure that the implementation of the feature complies with the compatibility rules of the biometry API specification. For some of the tests, the accompanying information for the test may include pre-generated sample data needed to accomplish test. For other tests, any sample data required may be generated by the tests during execution if the API under test provides functionality to generate the sample data.

In some embodiments of the invention, the biometry API specification does not specify the format of the biometric templates or the type of biometric data (e.g., fingerprint, iris scan, etc.). In addition, the biometry API specification does not specify methods for generation of biometric template data. As a consequence, in some embodiments of the invention, tests directed to those features of the biometry API that use biometric templates containing biometric data of specific types may not presume the format of a biometric template or the type of biometric data in a template nor may the tests generate the needed sample biometric templates during execution.

In one or more embodiments of the invention, a test suite (e.g., Test Suite (166)) provides support for tests involving all biometric template formats supported by the biometry API without requiring that the tests be aware of the formats of the biometric templates or the type of biometric data. Specifically, the test suite (e.g., Test Suite (166)) includes a biometric provider interface (e.g., Biometric Provider Interface (168)) that may be used by tests in the test suite to acquire sample biometric templates needed for executing the tests. The biometric provider interface may also include other functionality that may be used by the test suite to determine the types of biometric data supported by the biometry API and the supported providers of each type of biometric data. The provider of a type of biometric data is important because different providers (e.g., biometric devices) of the same type of biometric data may provide that data in different formats. As is explained in more detail below, one or more biometric providers (e.g., Biometric Provider (164)) may implement the functionality of the biometric provider interface.

A test in the test suite may use the biometric provider interface (e.g., Biometric Provider Interface (168)) to request different types of sample biometric templates need to perform the test. Further, each type of sample biometric template may be requested to include a type of biometric data supported by the biometry API under test (e.g., Biometry API (160)). In addition, if the biometry API accepts the same type of biometric data from multiple providers, the sample biometric template may be requested to be in the format used by a specific provider. Specifically, in some embodiments of the invention, the biometric provider interface may include methods that may be invoked by a test to request a specific type of sample biometric template. The methods may include the ability to specify the type of biometric data to be included in the requested sample biometric template and to specify that the sample biometric template be in the format supported by a specific provider of the requested type of biometric data. The types of biometric data supported by the biometry API and the providers of the supported types of biometric data may be determined by invoking methods that return identifiers for all the supported types of biometric data and for the supported providers.

In some embodiments of the inventions, the methods for requesting specific types of sample biometric templates that are included in a biometric provider interface (e.g., Biometric Provider Interface (168)) are selected based on sample data requirements drawn from the biometry API specification. For example, the different types of sample biometric templates needed for testing purposes may be determined from the usage of biometric templates and/or the expected behavior of the biometry API components as specified in the biometry API specification. In some instances, the biometry API specification may define the types of biometric templates explicitly or the types may be inferred from descriptions of required behaviors.

For example, for compatibility testing of a JAVA CARD™ Biometry API, the types of sample biometric templates needed may include a reference biometric template, an invalid reference biometric template, a positive candidate biometric template, a negative candidate biometric template, and an invalid candidate biometric template. Further, a biometric provider interface for testing a JAVA CARD™ Biometry API may include a specific method for each type of sample biometric template that may be used to request a sample biometric template of that type. The biometric provider interface may also include methods for requesting the types of biometric data and the providers of the supported types of biometric data supported by a JAVA CARD™ Biometry API.

Table 1 illustrates the methods specified in an example biometric provider interface for testing a JAVA CARD™ Biometry API in accordance with one or more embodiments of the invention. As referenced in Table 1, an RID (registered identifier) is an identifier assigned to a provider of biometric data (e.g., a specific biometric device or a specific company making biometric devices) by the International Organization for Standardization (ISO).

TABLE 1 getAllBiometricProvidersRIDs ( )
    Returns the RIDs of the providers of biometric data supported by the API.
getAllInitParamValues (byte bioType, byte [ ] RID)
    Returns the possible values of the initialization parameters for the specified biometric data type as provided by the specified provider of biometric data
getDefaultBiometricProviderRID ( )
    Returns the RID of the default provider of biometric data
getInvalidCandidateData (byte bioType, byte [ ] RID, byte initParam)
    Returns an invalid sample candidate biometric template for the specified
    type of biometric data and in the format supported by the specified provider of biometric data
getInvalidReferenceData (byte bioType, byte [ ] RID, byte initParam)
    Returns an invalid sample reference biometric template for the specified
    type of biometric data and in the format supported by the specified provider of biometric data
getNegativeCandidate (byte bioType, byte [ ] RID, byte initParam)
    Returns a sample candidate biometric template for the specified type of
    biometric data and in the format supported by the specified provider of
    biometric data. The sample candidate biometric template returned will be
    rejected when matched with a sample reference biometric template for
    the specified type of biometric data in the format supported by the specified provider as supplied by a call to getReferenceBioTemplate
getPositiveCandidate (byte bioType, byte [ ] RID, byte initParam)
    Returns a sample candidate biometric template for the specified type of
    biometric data and in the format supported by the specified provider of
    biometric data. The sample candidate biometric template returned will be
    accepted when matched with a sample reference biometric template for
    the specified type of biometric data in the format supported by the specified provider as supplied by a call to getReferenceBioTemplate
getReferenceBioTemplate (byte bioType, byte [ ] RID, byte initParam)
    Returns an sample reference biometric template for the specified type of
    biometric data and in the format supported by the specified provider of
    biometric data
getSupportedBioTypes (byte[ ] RID)
    Returns identifiers for all of the types of biometric data supported by the
    specified provider of biometric data
    isSupportedBioType (byte biotype, byte[ ] RID)
    Returns true if the specified type of biometric data is supported by the specified provider of biometric data.

In one or more embodiments of the invention, a biometric provider (e.g., Biometric Provider (164)) implements the functionality of the biometric provider interface (e.g., Biometric Provider Interface (168)). More specifically, in one or more embodiments of the invention, the biometric provider implements the methods specified by the biometric provider interface. In some embodiments of the invention, the biometric provider (e.g., biometric provider (164)) may be supplied by a user of the test suite (e.g., Test Suite (166)). For example, the implementer of a biometric server including the biometry API to be tested may supply a biometric provider capable of providing test data specific to the biometry API.

In some embodiments of the invention, the biometric provider may support the testing of multiple biometry APIs (i.e., multiple concrete implementations of the biometry API specification) irrespective of the types of biometric data and/or the providers of the biometric data supported by a particular biometry API. More specifically, the biometric provider may include functionality to provide sample biometric templates for multiple types of biometric data. The biometric provider may also include functionality to provide the sample biometric templates in the formats of multiple providers of the multiple types of biometric data.

In one or more embodiments of the invention, the biometric provider (e.g., biometric provider (164)) may include functionality to generate the sample biometric templates upon request. The generation of the biometric data in the sample biometric template may be accomplished using any biometric data generation algorithm known in the art. In some embodiments of the invention, the biometric provider may include functionality to supply a requested sample biometric template of a specified provider format including biometric data of a specified by type by obtaining the requested sample biometric template from a repository (not shown) of previously acquired or generated sample biometric templates.

Further, in one or more embodiments of the invention, the biometric provider (e.g., biometric provider (164)) may include functionality to access a biometric device (not shown) to provide the requested sample biometric template. If the biometric device is capable of providing a biometric template in the requested format, the biometric provider may include functionality to request a biometric template from the biometric device and return that biometric template as the sample biometric template. If the biometric device is not capable of providing a biometric template in the requested format, the biometric provider may include functionality to acquire biometric data from the biometric device and process the acquired data to create the requested sample biometric template. The biometric provider may also include functionality to convert biometric data from a biometric device in the format of one provider into biometric data of the same type in the format of another provider. Moreover, in one or more embodiments of the invention, the biometric provider may include any combination of the previously mentioned functionalities for supplying a sample biometric template.

In one or more embodiments of the invention, the system of FIG. 1B may operate as follows. Using a biometric provider interface (e.g., Biometric Provider Interface (168)), a test in a test suite (e.g., Test Suite (166)) requests a sample biometric template containing a specific type of biometric data and in the format of a specific provider of the type of biometric data. The requested sample biometric template is needed by the test to verify the behavior of a feature of a biometry API (e.g., Biometry API (160)). A biometric provider (e.g., Biometric Provider (164)) that implements the biometric provider interface receives and processes the request, returning the requested sample biometric template. The test may then use the sample biometric template to test the feature of the biometry API.

In one or more embodiments of the invention, the biometry API under test may be a JAVA CARD™ Biometry API and the biometry server may be a JAVA CARD™ biometry server. In such embodiments, compatibility testing may include both an on-card application (e.g., Biometric Server Application (158)) in the form of a JAVA CARD™ applet and an off-card application (e.g., a test suite such as Test Suite (166)). The off-card application includes a test execution script that creates an instance of a biometric provider (e.g., Biometric Provider (164)). In one or more embodiments of the invention, the script obtains sample biometric templates of the needed types (i.e., a reference biometric template, candidate template, positive or negative candidate templates, invalid biometric data, etc.) from the biometric provider via a biometric provider interface (e.g., Biometric Provider Interface (168))

and sends the sample biometric templates to the on-card application (e.g., Biometric Server Application (158)).

In some embodiments of the invention, the on-card application (i.e., the JAVA CARD™ applet) may be created by the test suite (e.g., Test Suite (166)) and installed on the biometric server (e.g., Biometric Server (150)) at the beginning of the compatibility testing. The applet receives the sample biometric templates and provides the templates to the biometry API (e.g., Biometry API (160)) to perform the tests. The applet then sends a response to the test script that the test script evaluates to report a passed or failed status.

FIGS. 2-5 show block diagrams of various embodiments of a system for testing a biometry API in accordance with one or more embodiments of the invention. Each of these figures includes a data source (e.g., Data Source (200), Data Source (300), Data Source (400), Data Source (500), Data Source (502)). A data source in one or more embodiments of the invention may be any combination of biometric data sources (e.g., a repository of previously collected or generated biometric samples and/or biometric templates, one or more algorithms that generate biometric samples and/or biometric templates, one or more biometric devices that may be used to generate biometric samples and/or biometric templates, etc.).

Figure 2:
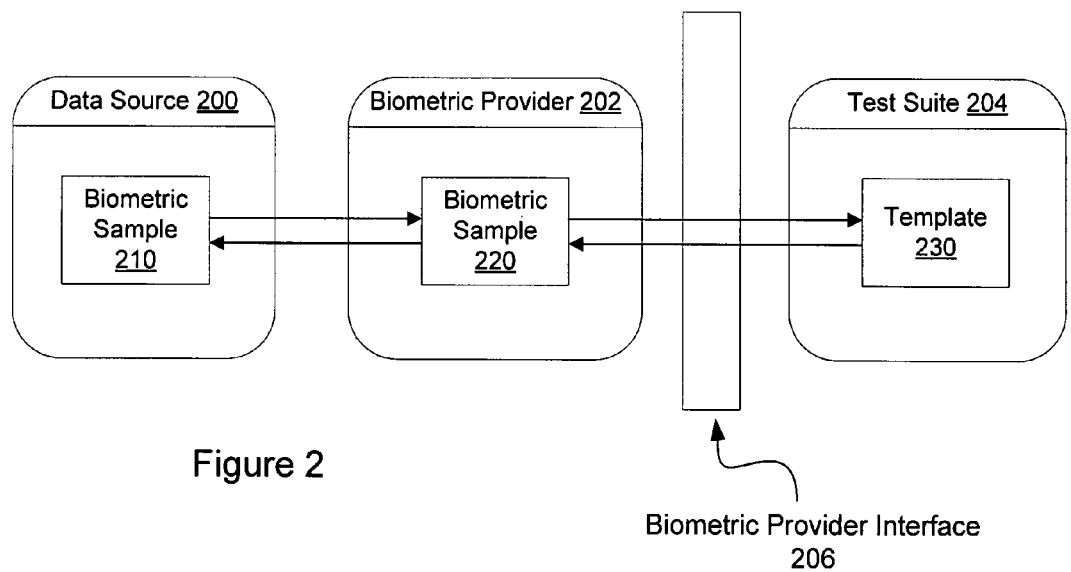

FIG. 2 shows an embodiment of a system for testing a biometry API in which a sample biometric template of the type needed for a particular test in a test suite (e.g., Test Suite (204)) is requested. During execution of the compatibility tests, a test in the test suite (e.g., Test Suite (201)) may request a sample biometric template needed for the test. The request may specify the type of sample biometric template needed (e.g., a sample reference biometric template), the type of biometric data needed, and the provider of the biometric data. To make the request, the test uses a biometric provider interface (e.g., Biometric Provider Interface (206)) that is implemented by a biometric provider (e.g., Biometric Provider (202)). The biometric provider fulfills this request by acquiring a biometric sample of the specified type of biometric data (e.g., Biometric Sample (210)) from a data source (e.g., Data Source (200)). The biometric provider then performs the processing necessary to convert the acquired biometric sample (e.g., Biometric Sample (220)) into a sample biometric template (e.g., Template (230)) in the format of the specified provider of the biometric data and sends the sample to the test suite for use.

Figure 3:
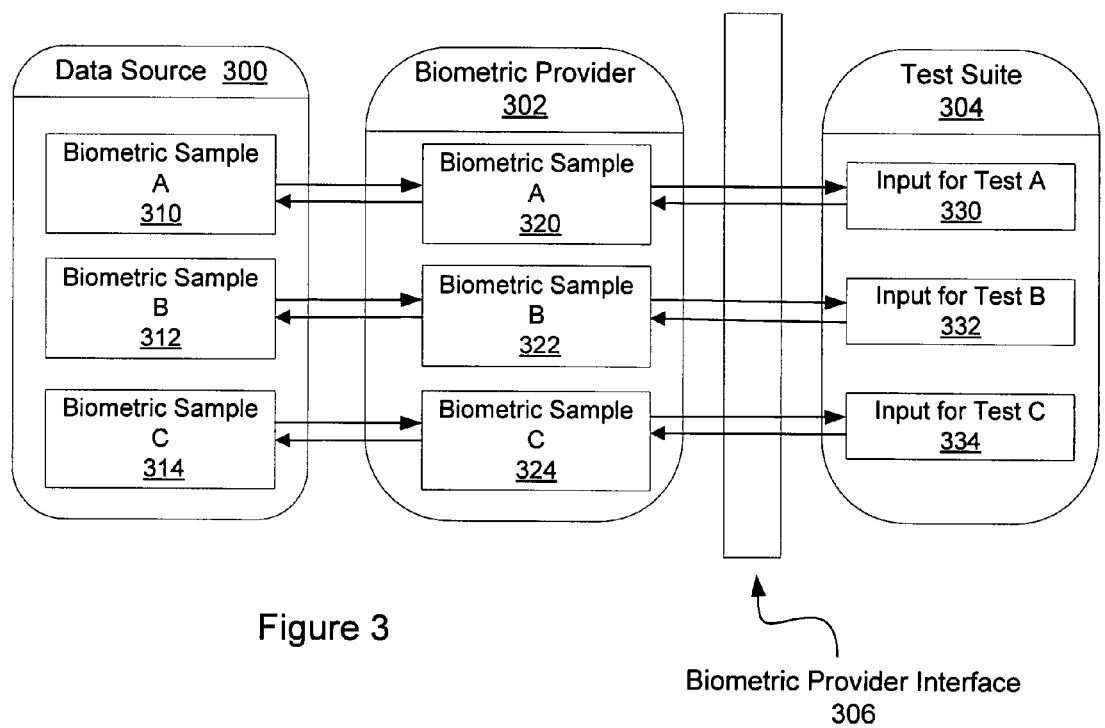

FIG. 3 shows an embodiment of a system for testing a biometry API in which a test suite (e.g., Test Suite (304)) requests sample biometric templates as input for different tests (e.g., a positive test, a negative test, etc.). During execution of the compatibility tests, the test suite may request different types of sample biometric templates (e.g., a sample reference biometric template, a sample positive candidate biometric template, a sample negative candidate biometric template, etc.) as input (e.g., Input for Test A (330), Input for Test B (332), Input for Test C (334)) for tests.

Each request may specify the type of sample biometric template needed (e.g., a sample reference biometric template), the type of biometric data needed, and the provider of the biometric data. To make the requests, the test suite uses a biometric provider interface (e.g., Biometric Provider Interface (306)) that is implemented by a biometric provider (e.g., Biometric Provider (302)). The biometric provider fulfills the requests by acquiring biometric samples of the specified type(s) of biometric data (e.g., Biometric Sample A (310), Biometric Sample B (312), Biometric Sample C (314)) from a data source (e.g., Data Source (300)). The biometric provider then performs the processing necessary to convert the acquired biometric samples (e.g., Biometric Sample A (320), Biometric Sample B (322), Biometric Sample C (321)) into sample biometric templates in the format of the specified provider of the biometric data. The biometric provider then sends the sample biometric templates to the test suite for use as inputs (e.g., Input for Test A (330), Input for Test B (332), Input for Test C (334)) for tests.

Figure 4:
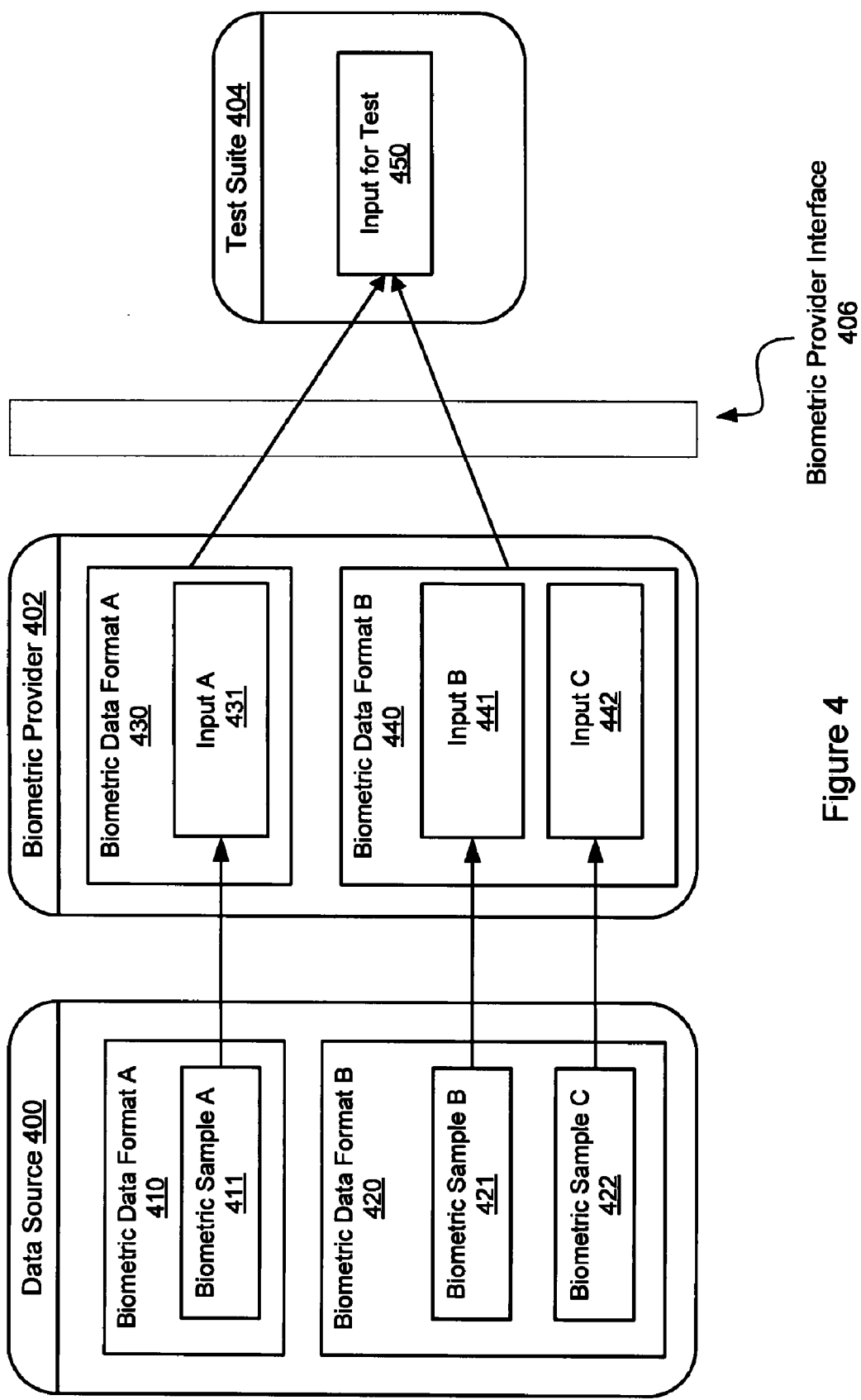

FIG. 4 shows an embodiment of a system for testing a biometry API in which a test suite (e.g., Test Suite (404)) requests sample biometric templates in different formats (e.g., Biometric Data Format A (430), Biometric Data Format B (440)) as input (e.g., Input for Test (450)) for a single test. During execution of the compatibility tests, a test in the test suite may request sample biometric templates in different formats as input. Each request may specify the type of sample biometric template needed, the type of biometric data needed, and the provider of the biometric data. For example, one test may request as input a sample biometric template in a format supported by one provider (e.g., Biometric Data Format A (430)) and then request as input sample biometric templates in a format supported by a different provider (e.g., Biometric Data Format B (440)).

To make the requests, the test uses a biometric provider interface (e.g., Biometric Provider Interface (406)) that is implemented by a biometric provider (e.g., Biometric Provider (402)). The biometric provider fulfills the requests by acquiring sample biometric templates from a data source (e.g., Data Source (400)). The sample biometric templates acquired in response to the requests from the test are in a format supported by a biometric device (e.g., Biometric Data Format A (410), Biometric Data Format B (420)) from which the biometric samples represented by the templates (e.g., Biometric Sample A (411), Biometric Sample B (421), Biometric Sample C (422)) are acquired.

The biometric provider then performs the processing necessary to convert the sample biometric templates acquired from the data source into the formats (e.g., Biometric Data Format A (430), Biometric Data Format B (440)) requested by the test. This processing produces sample biometric templates in the requested formats to be used as the inputs (e.g., Input A (431), Input B (441), Input C (442)) for the test.

Figure 5:
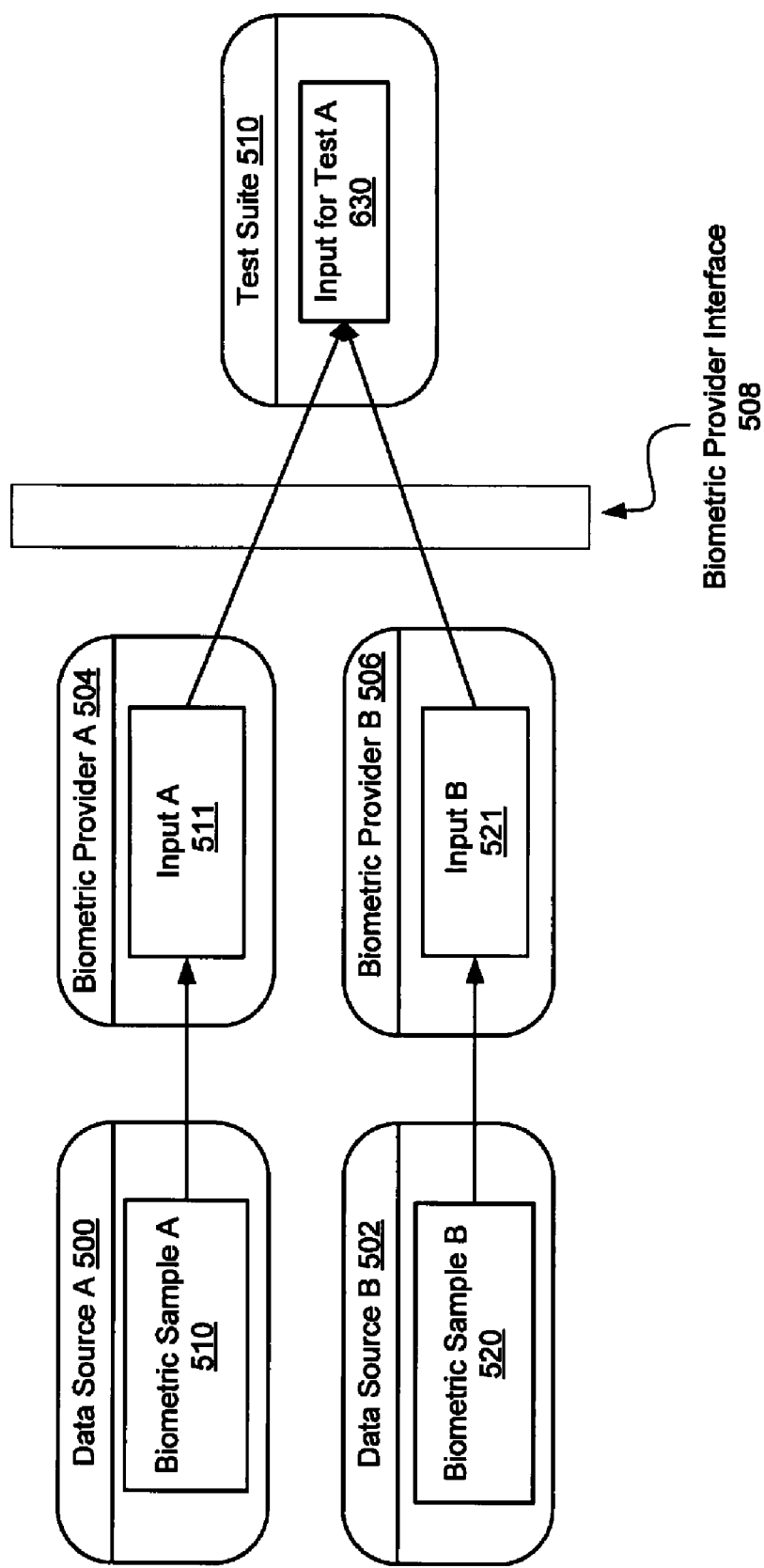

FIG. 5 shows an embodiment of a system for testing multiple biometry APIs in which a test suite (e.g., Test Suite (510)) may be used for testing different implementations (e.g., biometry API A and biometry API B) of a biometry API specification. In the embodiment of FIG. 5, two biometric providers (e.g., Biometric Provider A (504), Biometric Provider B (506)) implement the biometric provider interface (e.g., Biometric Provider Interface (508)) of the test suite (e.g., Test Suite (510)). Biometric Provider A (504) provides biometric test data of the types and formats used by biometry API A and Biometric Provider B (506) provides biometric test data of the types and formats used by biometry API B.

The test suite (e.g., Test Suite (510)) may first be executed to test biometry API A. During execution, a test in the test suite, Test A, may request a sample biometric template needed for the test. The request may specify the type of sample biometric template needed (e.g., a sample reference biometric template), the type of biometric data needed, and the provider of the biometric data. To make the request, the test uses the biometric provider interface (e.g., Biometric Provider Interface (508)) of the test suite. Biometric Provider A (504) fulfills this request by acquiring a biometric sample of the specified type of biometric data (e.g., Biometric Sample A (510)) from a data source (e.g., Data Source A (500)). Biometric Provider A (504) then performs the processing necessary to convert the acquired biometric sample (e.g., Biometric Sample A (510)) into a sample biometric template in the format of the specified provider to create Input A (511). Biometric Provider A (504) then provides Input A (511) to the test suite to be used as input for Test A.

The test suite (e.g., Test Suite (510)) may subsequently be executed to test biometry API B. During execution, Test A may again request a sample biometric template needed for the test. The request may specify the type of sample biometric template needed (e.g., a sample reference biometric template), the type of biometric data needed, and the provider of the biometric data. To make the request, the test uses the biometric provider interface (e.g., Biometric Provider Interface (508)) of the test suite. Biometric Provider B (506) fulfills this request by acquiring a biometric sample of the specified type of biometric data (e.g., Biometric Sample B (520)) from a data source (e.g., Data Source B (502)). Biometric Provider B (506) then performs the processing necessary to convert the acquired biometric sample (e.g., Biometric Sample B (520)) into a sample biometric template in the format of the specified provider to create Input B (521). Biometric Provider B (506) then provides Input B (521) to the test suite to be used as input for Test A.

Figure 6:
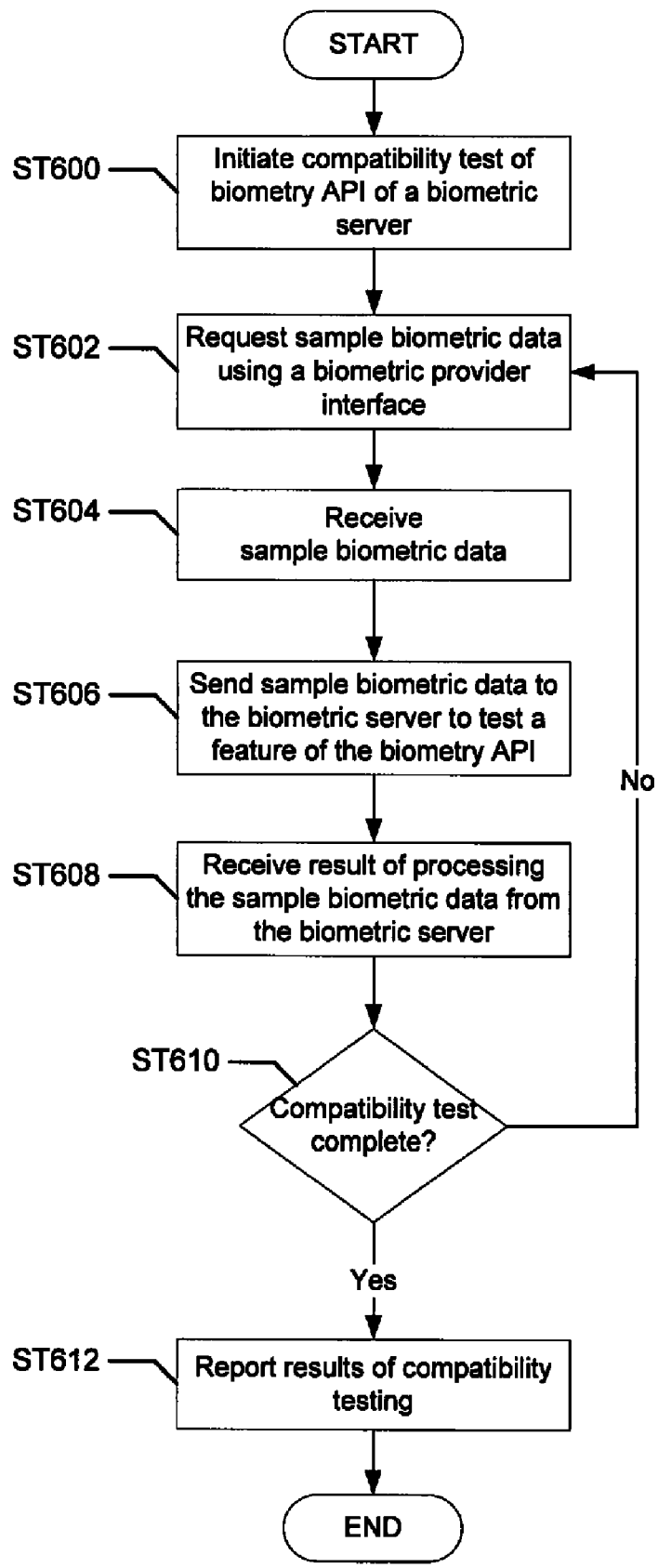
FIGS. 6-7 show flowcharts in accordance with one or more embodiments of the invention.
Figure 7:
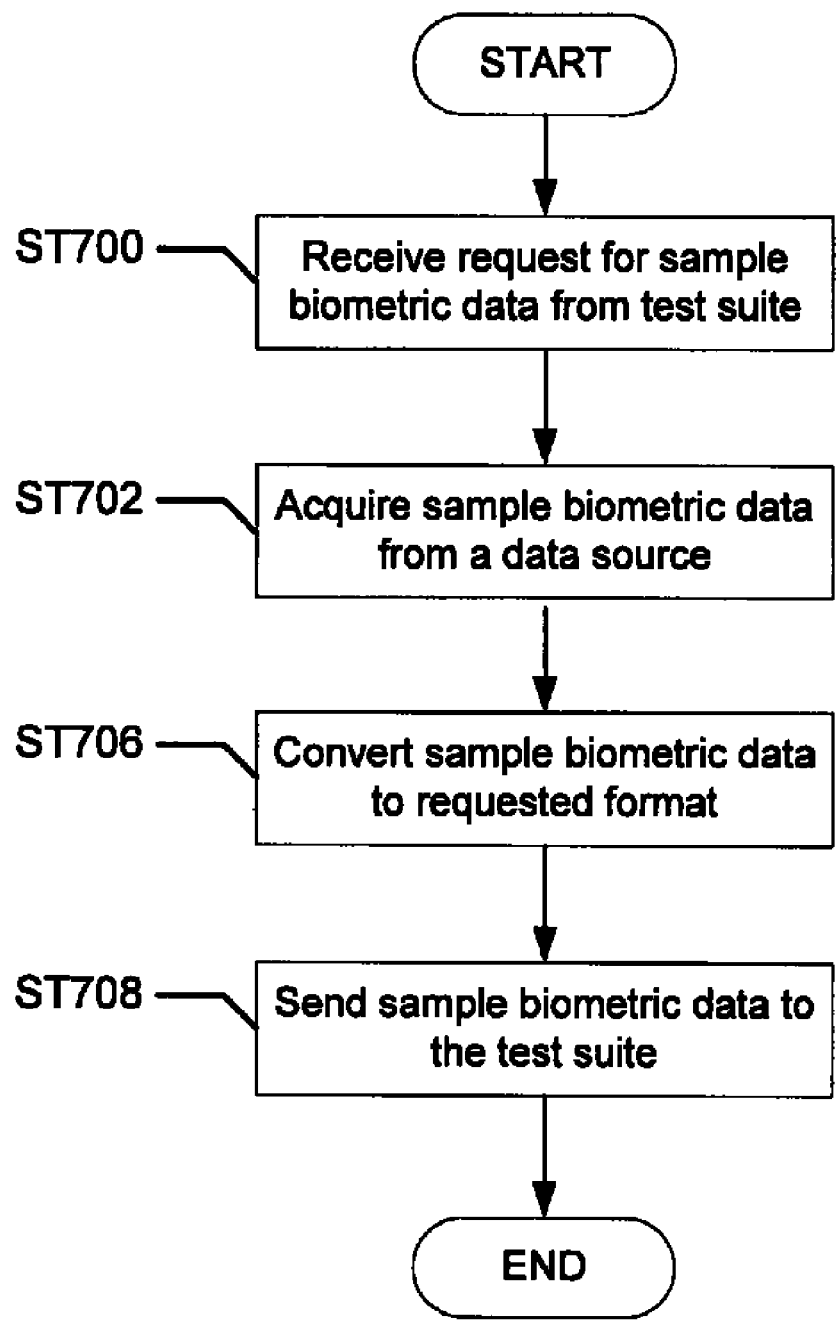

FIGS. 6 and 7 show flowcharts of performing compatibility testing of a biometry API in accordance with one or more embodiments of the invention. While the various steps in these flowcharts are presented and described sequentially, one of ordinary skill will appreciate that some or all of the steps may be executed in different orders, some or all of the steps may be executed in parallel, and one or more of the steps may be optional.

As is shown in the flowchart of FIG. 6, compatibility testing of a biometry API using a test suite is initiated (ST600). In some embodiments of the invention, the biometry API is a concrete implementation of a biometry API specification and the tests in the test suite are specifically designed to test the biometry API for compatibility with the specification. Further, the biometry API may be implemented as part of a biometric server. The biometry API may expose classes and interfaces for using the services (e.g., biometric matching, user enrollment, reference template creation, etc.) of the biometric server.

Further, the biometry API may expect biometric data of specific types and in specific formats supported by one or more providers of the specific types of biometric data. In one or more embodiments of the invention, the biometry API may expect the biometric data in the form of biometric templates. In some embodiments of the invention, the test suite includes a biometric provider interface that is used to request sample biometric data (e.g., sample biometric templates) of the types needed for the compatibility tests (e.g., sample reference biometric data, sample positive candidate biometric data, etc.). The test suite may specify the type of biometric data needed (e.g., a fingerprint) and the format of the biometric data when requesting the sample biometric data.

During the compatibility testing process, when sample biometric data is needed for a test, the test suite requests the needed sample biometric data using the biometric provider interface (ST602). The biometric provider interface is implemented by a biometric provider that supplies the requested sample biometric data. The flowchart of FIG. 7 illustrates the process of supplying the sample biometric data in accordance with one or more embodiments of the invention.

The test suite receives the requested sample biometric data via the biometric provider interface (ST604) and uses the sample biometric data as input for one or more tests. A test may send the sample biometric data to the biometric server to test a feature or a part of a feature of the biometry API (ST606). The test suite subsequently receives the result of processing the sample biometric data (i.e., the result of the test) from the biometric server (ST610). The process of requesting sample biometric data, using the sample biometric data to test a feature of the biometry API, and receiving a result of processing the sample biometric data (ST602-ST608) is repeated as needed until the compatibility testing process is completed (ST610). When the compatibility testing process is completed, the results of the compatibility testing are reported (ST612).

As is shown in the flowchart of FIG. 7, during compatibility testing of a biometry API, a biometric provider receives a request for sample biometric data from the test suite (ST700). The biometric provider then acquires the sample biometric data from a data source. In one or more embodiments of the invention, the biometric provider may acquire the request biometric sample data from one of several data sources (ST702). For example, the biometric provider may acquire the requested biometric sample data from a repository of previously acquired or pre-generated sample biometric data. Or, the biometric provider may generate the requested sample biometric data using one or more algorithms. Further, the biometric provider may request biometric data of the type needed from a biometric device providing data of the requested type. If the acquired sample biometric data is not in the format requested, the biometric provider converts the sample biometric data to the requested format (ST706). Ultimately, the biometric provider sends the requested sample biometric data to the test suite (ST708).

Embodiments of the invention permit a compatibility test suite to test a biometry API for compatibility with a biometry API specification that does not constrain the types or formats of the biometric data used by an implementation of the specification. Furthermore, embodiments of the invention allow the same compatibility test suite to be used to test different implementations of the biometry API specification that use different types of biometric data and/or biometric data in different formats.

Moreover, one of ordinary skill will appreciate that embodiments of the invention permit a compatibility test suite to test any API implementation of an API specification that does not constrain the types or formats of the data used by an implementation. The types and formats of sample data may be determined from the usage of the data and/or the expected behavior of the API components as specified in the API specification. An interface for acquiring sample data in the types and formats needed for compatibility testing may be defined and used in the compatibility test suite. One or more providers capable of providing the required sample data for corresponding API implementations may implement the interface and be used during the compatibility testing process to supply the required sample data.

Figure 8:
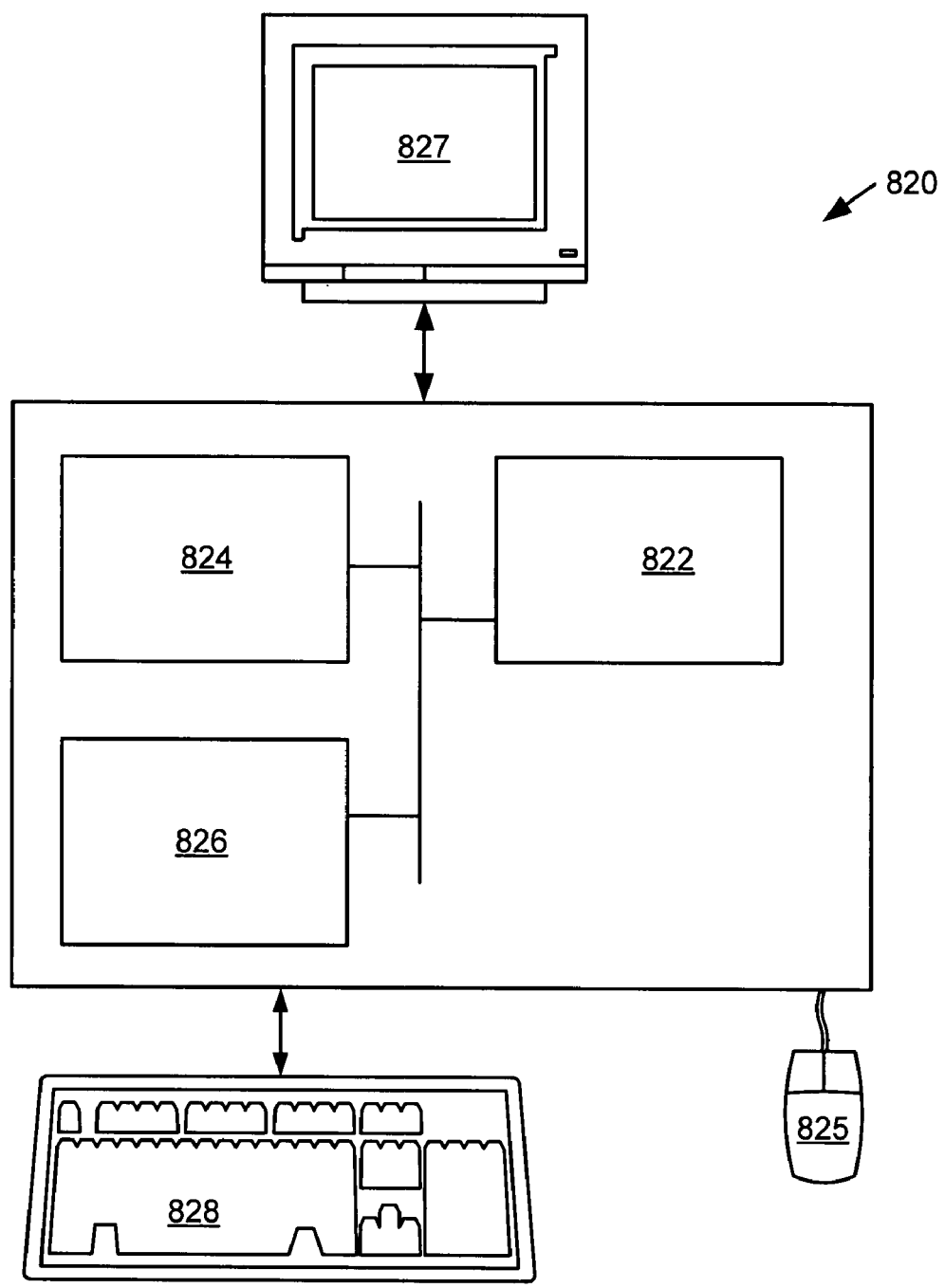
FIG. 8 shows a computer system in accordance with one or more embodiments of the invention.

Embodiments of the invention may be implemented on virtually any type of computer regardless of the platform being used. For example, as shown in FIG. 8, a computer system (820) includes a processor (824), associated memory (826), a storage device (822), and numerous other elements and functionalities typical of today's computers (not shown). The computer (820) may also include input means, such as a keyboard (828) and a mouse (825), and output means, such as a monitor (827). The computer system (820) may be connected to a local area network (LAN) (not shown) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (820)

may be located at a remote location and connected to the other elements over a network. Further, embodiments of the invention may be implemented on a distributed system having a plurality of nodes. In one or more embodiments of the invention, the node corresponds to a computer system. Alternatively, the node may correspond to a processor with associated physical memory. The node may alternatively correspond to a processor with shared memory and/or resources. Further, software instructions to perform one or more embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for compatibility testing comprising:
   a hardware processor;
   a test suite executing on the hardware processor and comprising a plurality of compatibility tests, wherein the test suite is configured to:
   use a provider interface to request biometric sample data for at least one compatibility test of the plurality of compatibility tests, wherein the biometric sample data corresponds to a biometry application programming interface (API) implementation;
   receive the requested biometric sample data using the provider interface;
   execute, using the requested biometric sample data, the at least one compatibility test to obtain a test result; and
   determine, based on the test result, a compatibility of the biometry API implementation with a biometry API specification; and
   a provider configured to implement the provider interface, wherein the provider supplies the requested biometric sample data to the test suite,
   wherein a type of the biometric sample data is determined from the biometry API specification, and
   wherein the provider interface comprises functionality to request biometric sample data corresponding to the type.

2. The system of claim 1, wherein the biometry API is a JAVA CARD™ Biometry API and the biometry API specification is the JAVA CARD™ Biometry API Specification.

3. The system of claim 1, further comprising a biometric server operatively connected to the test suite, wherein the biometric server comprises the biometry API implementation.

4. The system of claim 1, further comprising a data source operatively connected to the provider, wherein the provider supplies the requested sample data using the data source.

5. The system of claim 4, wherein the data source is at least one selected from a group consisting of: a repository storing the requested biometric sample data, an algorithm used to generate the biometric sample data, and a device used to generate the biometric sample data.

6. The system of claim 1, wherein the biometric sample data comprises a type of biometric data.

7. The system of claim 6, wherein the biometric sample data further comprises a format of the type of biometric data.

8. The system of claim 1, wherein the biometric sample data comprises a sample biometric template, wherein the sample biometric template is one selected from a group consisting of: a reference biometric template, an invalid reference biometric template, a positive candidate biometric template, a negative candidate biometric template, and an invalid candidate biometric template.

9. A method for compatibility testing comprising:
   executing, using a processor, a test suite to test a biometry application programming interface (API) implementation, wherein the test suite comprises a plurality of compatibility tests that test a compatibility of the biometry API implementation to a biometry API specification;
   requesting biometric sample data for at least one test of the plurality of compatibility tests using a provider interface, wherein the biometric sample data corresponds to the biometry API implementation;
   receiving the biometric requested sample data from a provider, wherein the provider implements the provider interface;
   using the biometric sample data by the at least one test to test the biometry API implementation;
   receiving a result of the at least one test, wherein the result of the at least one test indicates the compatibility of the biometry API implementation to the biometry API specification; and
   reporting a result of executing the test suite using the result of the at least one test,
   wherein a type of the biometric sample data is determined from the biometry API specification, and
   wherein the provider interface comprises functionality to request biometric sample data corresponding to the type.

10. The method of claim 9, wherein the biometry API is a JAVA CARD™ Biometry API and the biometry API specification is the JAVA CARD™ Biometry API Specification.

11. The method of claim 9, the biometry API implementation is comprised in a biometry server.

12. The method of claim 9, wherein the provider supplies the requested biometric sample data using a data source, wherein the data source is at least one selected from a group consisting of: a repository storing the requested biometric sample data, an algorithm used to generate the biometric sample data, and a device used to generate the biometric sample data.

13. The method of claim 9, wherein the biometric sample data comprises a type of biometric data.

14. The method of claim 13, wherein the biometric sample data further comprises a format of the type of biometric data.

15. The method of claim 9, wherein the biometric sample data comprises a sample biometric template, wherein the sample biometric template is one selected from a group consisting of: a reference biometric template, an invalid reference biometric template, a positive candidate biometric template, a negative candidate biometric template, and an invalid candidate biometric template.

16. A non-transitory computer readable medium storing computer code for causing a computer system to perform compatibility testing, the computer program code comprising instructions to:
   execute a test suite to test a biometry application programming interface (API) implementation, wherein the test suite comprises a plurality of compatibility tests that test a compatibility of the biometry API implementation to a biometry API specification;
   request biometric sample data for at least one test of the plurality of compatibility tests using a provider interface, wherein the biometric sample data corresponds to the biometry API implementation;

receive the requested biometric sample data from a provider, wherein the provider implements the provider interface;
use the biometric sample data by the at least one test to test the biometry API implementation;
receive a result of the at least one test, wherein the result of the at least one test indicates the compatibility of the biometry API implementation to the biometry API specification; and
report a result of executing the test suite using the result of the at least one test,
wherein a type of the biometric sample data is determined from the biometry API specification, and
wherein the provider interface comprises functionality to request biometric sample data corresponding to the type.

* * * * *